United States Patent [19]

Hirs

[11] Patent Number: 5,795,478
[45] Date of Patent: Aug. 18, 1998

[54] OIL EXTRACTION SYSTEM

[76] Inventor: Gene Hirs, 3822 W. Thirteen Mile Rd., Apt. D, Royal Oak, Mich. 48073

[21] Appl. No.: 784,084

[22] Filed: Jan. 15, 1997

[51] Int. Cl.⁶ ............................................. C02F 1/40
[52] U.S. Cl. ..................... 210/521; 210/537; 210/540; 210/DIG. 5
[58] Field of Search ..................... 210/521, 522, 210/537, 538, 540, DIG. 5

[56] References Cited

U.S. PATENT DOCUMENTS

| | | | |
|---|---|---|---|
| 3,529,728 | 9/1970 | Middelbeek et al. | 210/522 |
| 3,613,889 | 10/1971 | Reed | 210/540 |
| 4,123,365 | 10/1978 | Middelbeek | 210/521 |
| 4,132,645 | 1/1979 | Bottomley et al. | 210/540 |
| 4,132,651 | 1/1979 | deJong | 210/522 |
| 4,278,545 | 7/1981 | Batutis et al. | 210/521 |
| 5,236,585 | 8/1993 | Fink | 210/521 |
| 5,326,474 | 7/1994 | Adams et al. | 210/521 |
| 5,405,538 | 4/1995 | Batten | 210/546 |

FOREIGN PATENT DOCUMENTS

| | | |
|---|---|---|
| 52-48871 | 4/1977 | Japan. |
| 1641384 | 4/1991 | U.S.S.R. |

Primary Examiner—Christopher Upton
Attorney, Agent, or Firm—Lyon, P.C.

[57] ABSTRACT

A system for extracting solids and free or "tramp" oil from an industrial machining fluid comprises a pressurized tank having a plurality of horizontally orientated polymeric elements therein past which fluid is free to flow without obstruction. Free oil is removed from the machining fluid through oleophilic attraction between the free oil and the surface of the polymeric elements when the tank is filled with fluid. The free oil and solids are removed from the machining fluid in a gravity separation chamber.

5 Claims, 1 Drawing Sheet

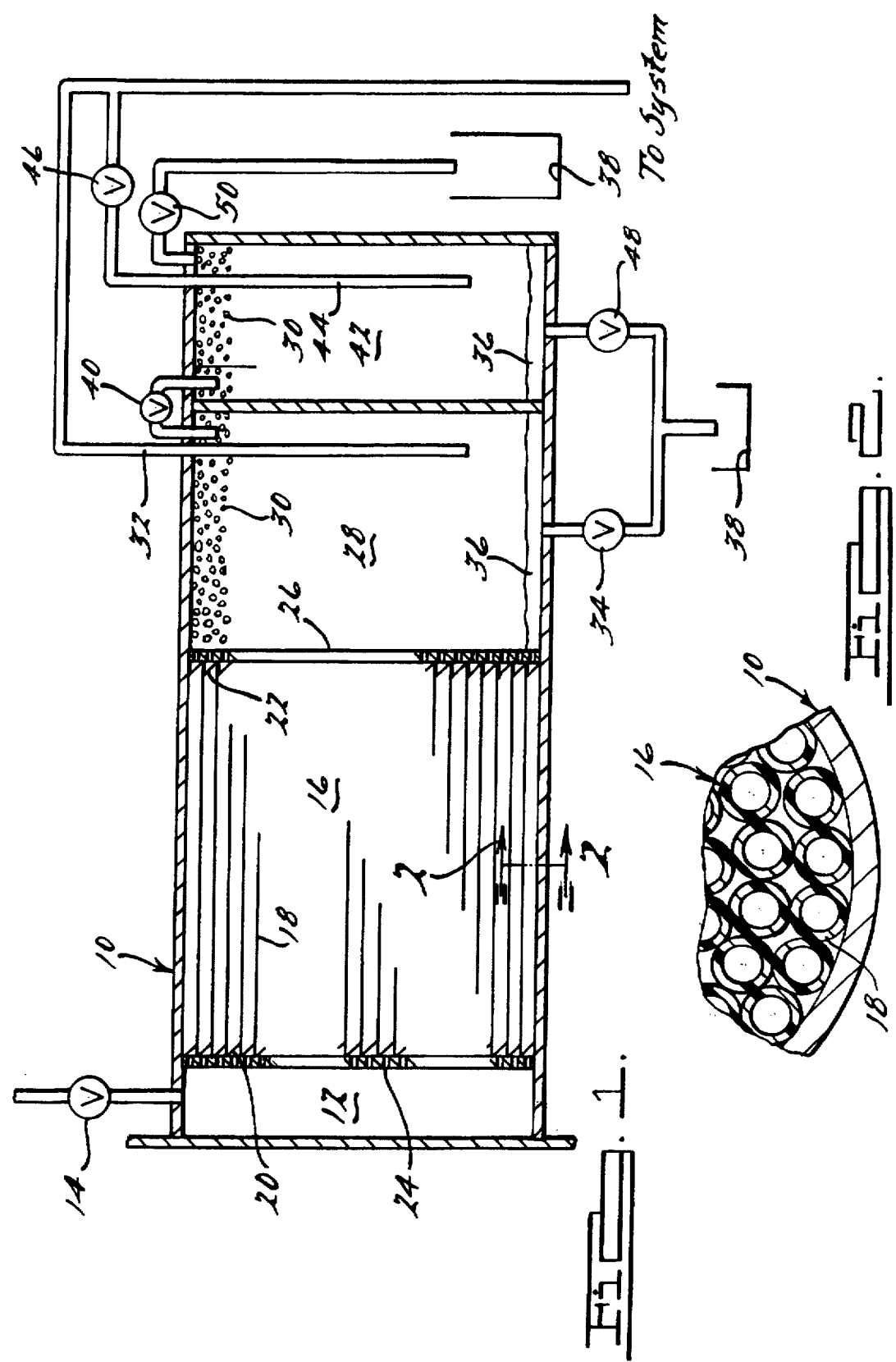

OIL EXTRACTION SYSTEM

BACKGROUND OF THE INVENTION

The present invention relates to liquid purification systems and particularly to a system for removing free oil and fine solids from fluids utilized in industrial machining operations.

Machining operations generally require the use of coolants to prevent damage to tools due to excessive heat. Typically, a coolant comprises an oil-in-water emulsion wherein water is the continuous phase, oil is the disperse phase, and soap is the emulsifying agent. The emulsion is stabilized by electro-mechanical forces which are weakened or destroyed by contaminants in the form of metallic ions, free oil bacterial action, and fine solids.

The most serious culprit in coolant deterioration is free or "tramp" oil which must be removed to maintain the stability and equilibrium of the emulsion. Moreover, colloidal solids, often suspended in the emulsion, are not only abrasive but act as a substrate for bacterial enzymatic production that promotes agglomeration thereof and a subsequent decline in the quality of the coolant. Excessive and frequent blockages in cartridge filters, for example, can be correlated to an increase in suspended solids and bacterial activity.

SUMMARY OF THE INVENTION

The aforesaid problems are solved, in accordance with a preferred constructed embodiment of the present invention, by a pressurized oil and colloidal solid extractor that operates in a closed system to remove free oil and solids from an oil-in-water emulsion machining fluid without requiring pumps or electric controls. The oil extractor comprises a cylindrical tank, the entire cross section of which is filled by a plurality of spaced horizontally oriented polymeric oil extraction elements, for example right circular cylindrical tubes. The tank is filled with pressurized coolant at all times and the tubes are submerged in the coolant. Coolant flows horizontally through the tubes without restriction. Oleophilic surface attraction between the polymeric tubes and free oil in the machining fluid attracts and coalesces the free oil on the walls of the tubes as long as the tubes are submerged. Minute free oil globules further coalesce at the upper extremity of the tank after exiting the tubes. Once through the tubes, the coolant and oil globules pass through two separators that remove the free oil and solids from the bulk coolant. The aforesaid operation provides for pressurized steady state coolant flow through the extractor.

BRIEF DESCRIPTION OF THE DRAWING

FIG. 1 is a sectional view of a preferred constructed embodiment of the present invention; and FIG. 2 is a cross-sectional view taken along the line 2—2 of FIG. 1.

DETAILED DESCRIPTION OF THE PREFERRED EMBODIMENT

Referring to FIG. 1, a system for extracting oil from industrial coolants or washer fluids comprises a closed cylindrical tank 10 for the acceptance of bulk coolant under system pressure. Coolant pressure and flow volume to an inlet chamber 12 of the tank 10 is controlled by an adjustable feed valve 14.

In accordance with the present invention, the entire coolant flow must pass through an oil extraction element 16 in the tank 10. In the preferred constructed embodiment, the element 16 comprised a plurality of nested horizontally oriented polymeric tubes 18. The tubes 18 are preferably made from high density polyethylene or polypropylene and have an inside diameter of $5/16$" and an outside diameter of $3/8$". The tubes 18 are provided with angularly oriented end faces 20 and 22 at opposite ends, respectively, to ensure coolant flow into and out of the tubes 18. A perforated input plate 24 and a perforated output plate 26 position the tubes 18. The holes in the perforated plates 24 and 26 are less than $1/8$" in diameter to ensure containment of the tubes 18 yet provide for flow of the coolant to a first integrated settling chamber 28.

After passing through the tubes 18, coalesced oil droplets 30 migrate to the top of the chamber 28. A return-to-system conduit 32 extends vertically downwardly into chamber 28 for return of purified fluid to the system. A sludge drain valve 34 is located at the bottom of chamber 28 to facilitate drainage of sludge 36 to a waste tank 38. An oil decant valve 40 and conduit 41 at the top of the chamber 28 are connected to a second stage settling chamber 42 for the transfer of only the coalesced "tramp" oil 30 thereto.

A return-to-system conduit 44 extends vertically downwardly into chamber 42 for removal of purified fluid to the coolant system through a valve 46. A sludge drain valve 48 is located at the bottom of chamber 42 to facilitate drainage of sludge therefrom. A coalesced "tramp" oil decant valve 50 at the top of the chamber 42 controls the flow of "tramp" oil to the waste oil tank 38.

In operation, contaminated coolant flows into supply chamber 12 of the tank 10 thence through the horizontal tubes 18. Oleophilic attraction between the surface of the polyethylene tubes and free oil globules 30 promotes separation of the free oil globules 30 from the bulk coolant. The horizontal configuration of tubes 18, in combination with a reduction in the input pressure and flow rate at throttle valve 14, provides a relatively long and sedate coolant residence time within tank 10. Given the different densities of the free oil globules 30, bulk coolant and sludge 36, gravitational separation effects removal of the free oil globules 30 as well as sludge 36 from the coolant.

From the forgoing description it should be apparent that three distinct phases, namely coalesced "tramp" oil 30, coolant, and sludge 36 result as the coolant flows from the input chamber 12 to the output chamber 42 of the tank 10. The relatively low density "tramp" oil 30 agglomerates on the surface of the tubes 18 and migrates to the top of the chambers 28 and 42. The relatively higher density coolant accumulates in the central region of the chambers 28 and 42. The sludge phase 36 settles to the bottom of the chambers 28 and 42.

System return stacks 32 and 44 return purified coolant back to the main system. Oil decant valve 40 and associated piping decants "tramp" oil 30 from the chamber 28 to the chamber 42. Sludge 36 that sinks to the bottom of both chambers 28 and 42 is periodically drained to waste tank 38.

It will be understood that the invention should not be construed as limited to coolant applications, but is meant to encompass any machining fluid, for example as washer fluid used in industrial processes. Furthermore, the foregoing description of the preferred embodiment of the present invention is for illustrative purposes only, and the various structural and operational features herein disclosed are susceptible to a number of modifications, none of which departs from the spirit and scope of the present invention as defined in the appended claims.

I claim:

1. A pressurized system for removing free oil and fine solids from industrial machining and washing fluids comprising:

a cylindrical tank having an inlet chamber at one end thereof for the acceptance of contaminated fluid under pressure;

a plurality of horizontally oriented polymeric elements extending longitudinally of said tank and filling the entire lateral cross section thereof, said elements having laterally spaced surfaces for channeling fluid flow longitudinally of said tank and for attracting and coalescing free oil from said fluid by oleophilic attraction;

a gravity separation chamber at an opposite end of said tank from said inlet chamber wherein free oil is further coalesced at the top thereof and solids settle to the bottom thereof;

means for releasing fluid from a zone in said separation chamber between the coalesced oil and the solids for return to the fluid system;

means for releasing coalesced oil from the top of said separation chamber for discharge to waste; and means for releasing the solids from the bottom of said chamber for discharge to waste.

2. The system of claim 1 wherein said tank is of right circular cylindrical configuration and said inlet and separation chambers are at opposite ends thereof.

3. The system of claim 1 including a second gravity separation chamber having means to transfer coalesced oil between said chambers.

4. The system of claim 1 wherein said polymeric elements comprise tubes.

5. The system of claim 4 wherein said tubes are of right circular cylindrical configuration.

* * * * *